G. HEDÉN.
FLYING MACHINE.
APPLICATION FILED SEPT. 26, 1917.
1,307,047.
Patented June 17, 1919.
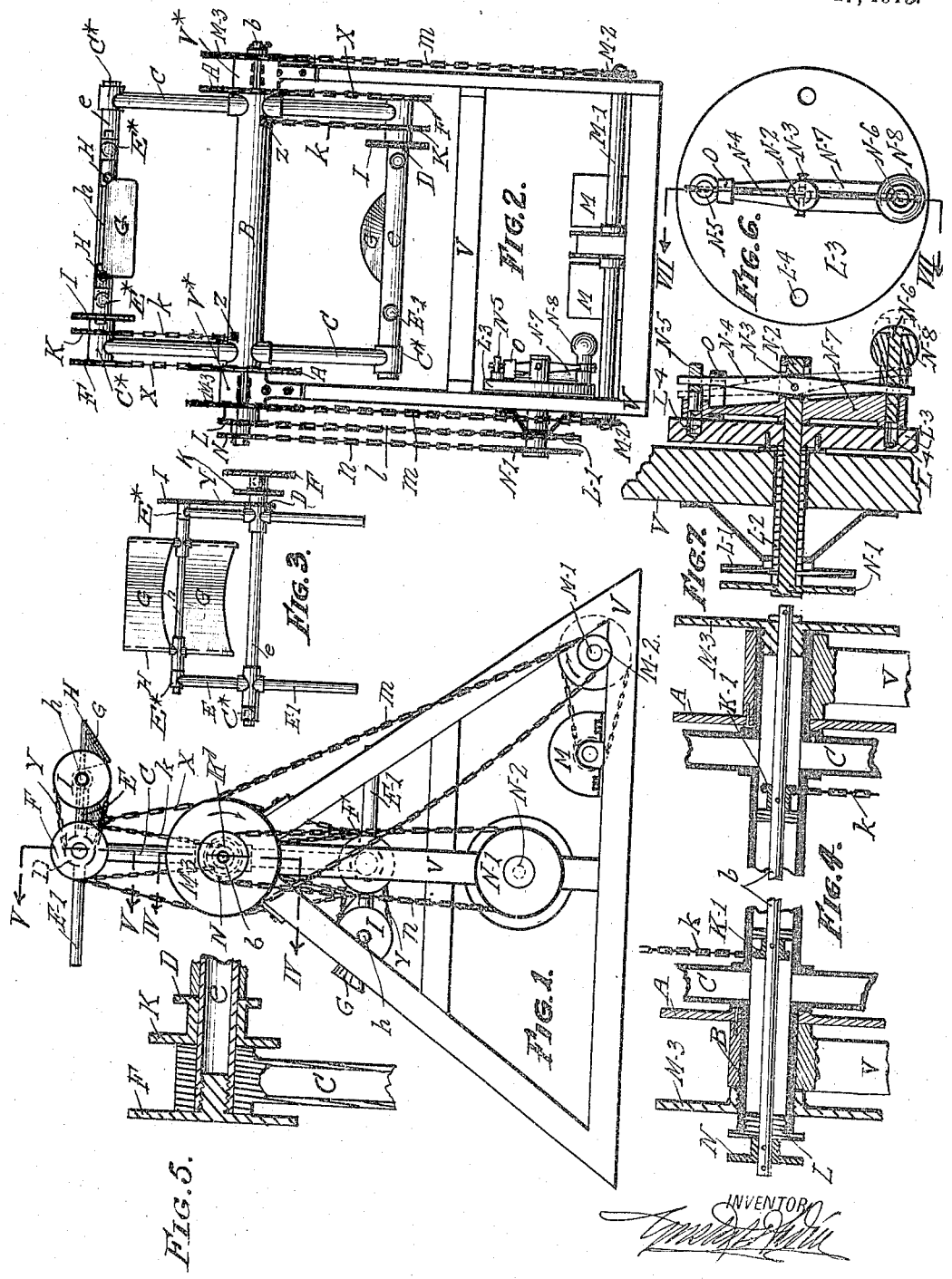
INVENTOR

UNITED STATES PATENT OFFICE.

GUSTAF HEDÉN, OF BROOKLYN, NEW YORK.

FLYING-MACHINE.

1,307,047. Specification of Letters Patent. Patented June 17, 1919.

Application filed September 26, 1917. Serial No. 193,298.

*To all whom it may concern:*

Be it known that I, GUSTAF HEDÉN, a citizen of the United States, and resident of the borough of Brooklyn, in the city and State of New York, have invented a new and useful Improvement in Flying - Machines, of which the following is a specification.

This invention relates to improvements in flying machines and has for its object to provide a buoying and driving mechanism having wings carried by rotatable frames on horizontal shafts which are controlled and operated in unison.

Another object is to provide a means for controlling the inclination of the wings during the rotation of the frames.

Another object is to provide certain improvements in the form, construction and arrangement of the several parts whereby the above and other objects may be effectively carried out.

A practical embodiment is represented in the accompanying drawings in which,

Figure 1 represents in side elevation, a portion of a flying machine which includes my improved construction.

Fig. 2 represents a front elevation of the same.

Fig. 3 represents a detail plan view of one of the wings, its frame and adjacent mechanism.

Fig. 4 represents an enlarged detail section of the main driving shaft, taken in the plane of the line IV—IV of Fig. 1, looking in the direction of the arrows.

Fig. 5 represents an enlarged detail section of one end of the wing frame supporting shaft taken in the plane of the line V—V of Fig. 1, looking in the direction of the arrows.

Fig. 6 represents in side elevation the inclinator disk and its adjacent mechanism, and Fig. 7 represents a vertical section of the same taken in the plane of the line VII—VII of Fig. 6, looking in the direction of the arrows.

The body of the machine, denoted by V, is provided with bearings V* in which is journaled a main driving shaft B. This shaft B is of hollow construction and provided with oppositely disposed radial arms C, the outer ends of which have bearings C* in which shafts $e$ are mounted. The shafts $e$ are each provided with a pair of radial arms E having bearings E* in which is mounted a wing shaft $h$.

This shaft $h$ is provided with oppositely disposed radial arms H which are arranged in pairs and have secured therebetween a sheet of silk, canvas or flexible material which forms the wings G. Each of the wings G has its sides secured to the arms H with the front edge drawn tightly between the arms H while the opposite or rear edge remains loose. By this construction the wing, when in use, will have a tendency to form a scoop, as shown in Figs. 1, 2 and 3. The wings G are arranged in pairs on the shaft $h$, so that the front edge of the forward wing will be drawn tightly at the outer and front end of its pair of arms H, while the front edge of the rear wing will be drawn tightly at the inner end of its pair of arms or near the shaft $h$, thus allowing the wings to operate in unison.

A pair of arms E' are secured to the shaft $e$ in position to counterbalance the arms E with their wings G.

Rotary motion is imparted to shaft B by means of motors M mounted on the body V, through a shaft M', and a chain and sprocket connection, as shown in Figs. 1 and 2. The shaft M' is provided with sprockets $M^2$ which are connected with sprockets $M^3$ fast on the shaft B, by chains $m$.

The shafts $e$, carrying the wings, receive their rotary motion through sprockets F and chains X secured to the shafts $e$, which chains are connected with sprockets A fast on the bearings V*.

The wing frames are held in a relatively fixed position by means of sprockets I fast on the shaft $h$ and connected to shafts $e$ by chains Y which are connected with sprockets D mounted to rotate freely on the shaft $e$. The sprockets D have sleeves and sprockets K secured therewith which are connected with a shaft $b$ mounted to rotate in bearings fast in the hollow shaft B, by means of chains $k$ which coact with sprockets K' on the shaft $b$. The shaft B has holes $z$ through which the chains $k$ pass to engage the sprocket K'. One end of the shaft $b$ extends beyond the hollow shaft B in position to receive a sprocket N which is connected by a chain $n$ and sprocket $N'$ on a shaft $N^2$ of a device for controlling the inclination of the wings. This device comprises a disk $L^3$ fixed to a sleeve $L^2$ which is mounted to rotate in the body V. The outer end of the sleeve $L^2$ is also provided with a sprocket $L'$ which is connected with a sprocket L on the shaft B by a chain $l$. The shaft $N^2$ is journaled in the sleeve $L^2$ and has a crank $N^7$ mounted thereon in close proximity to disk $L^3$. A rocking lever $N^4$ is pivoted at $N^3$ in the hub of the crank and the shaft $N^2$ and has one end provided with a pin $N^5$ arranged to be slid in the crank and engage holes $L^4$ in the disk $L^3$. The other end of the lever $N^4$ is provided with a handle $N^8$ having a guide pin $N^6$ slidable in the crank $N^7$. The lever $N^4$ and pin $N^5$ are normally held in engagement with the disk $L^3$, as shown in dotted outline in Fig. 7, by means of a contracting spring O in which position the disk and its adjacent mechanism are locked together and rotated with the shaft B through the sprockets L, $L'$ and chain $l$.

The rotation of the shaft B and its adjacent mechanism is controlled and operated as follows:

The motors M transmit power to the shaft $M'$ through the sprockets and chain connections, thence from the sprockets $M^2$ on the shaft $M'$, to the sprockets $M^3$ on the shaft B which travels in the direction shown by the arrow in Fig. 1. The shafts $e$ and arms E and $E'$ being carried by the arm C are caused to rotate by sprockets F fast on the shafts $e$, which sprockets are connected by a chain X to the sprockets A secured to the frame. The diameter of the sprockets F being half as large as that of sprockets A, which are stationary, transmit to the shaft $e$ and its arms an angular velocity twice as fast as that of the shaft B, and in the opposite direction. The shafts $h$ and the arms H carrying the wings are held in fixed positions relative to planes running through their centers of rotation, by sprockets I fast on the shafts $h$, connected by chains Y to sprockets D loose on the shafts $e$, thence from the sprockets K integral with the sleeves of the sprockets D, through chains $k$ which pass through the holes $z$ in the hollow shaft B, to sprockets $K'$ carried by the shaft $b$, thence from a sprocket N on the end of the shaft $b$ through a chain $n$ to a sprocket $N'$ on the shaft $N^2$ of the wing-controlling device. To further maintain the position of the wings, the relative speeds of the shafts $e$ and B are compensated by the difference in diameters of the various sprockets which are as follows: the diameter of the sprockets I and D being 2 to 1, the sprockets K and $K'$ being approximately 3 to 1, while the sprockets N and $N'$ are approximately 1 to 2.

The disk $L^3$ is positively rotated from the hollow shaft B, through the sprocket L carried thereby, a chain $l$ and the sprocket $L'$ fast on the sleeve $L^2$ of the disk. The diameter of the sprockets L and $L'$ being approximately 1 to 2, causes the disk $L^3$ to rotate at about one-half the speed of the shaft B.

To change the inclination of the wings, the rocking lever $N^4$ must be caused to assume the position shown in Fig. 7, in which position the crank $N^7$, pins $N^4$ and shaft $N^2$ carrying the sprocket $N'$ may be rotated by handle $N^8$ until the desired position is obtained, whereupon the handle is released and the pin $N^5$ by reason of the spring O acting on the lever $N^4$, is caused to enter one of the holes $L^4$ in the disk $L^3$. This rotation of the handle and lever transmits motion through the shaft $N^2$, sprocket $N'$, chain $n$, sprocket N on the shaft $b$, thence from the sprocket $K'$ on the shaft $b$, through the chains $k$, sprockets K and D, chain Y to sprocket I fast on the shaft $h$ which carries the wing frames.

Thus it will be seen that by the arrangement of the several sprockets and chains, the frames carrying the wings may be inclined at an angle relative to the plane of the body V, best suited to the velocity of flight, during the rotation of the hollow shaft B and its arms C, thus enabling the wings to compress and displace the air on the downward movement and by reason of the looseness or flexibility of the rear edges of the wings, evade the air during the upward movement.

What I claim is:

1. A flying machine comprising a body, rotatable arms mounted therein, rotatable frames on said arms, wings horizontally arranged on and rotatable in said frames, means for rotating the arms, means for rotating the frames in the arms, and means for automatically maintaining said wings in a predetermined position on the frames.

2. A flying machine comprising a body, rotatable arms mounted therein, rotatable frames on said arms, wings horizontally arranged on and rotatable in said frames, means for rotating the arms, means for rotating the frames in the arms, means on the body for changing the position of said wings on the frames relative to the body and means for automatically maintaining the wings in said position.

3. A flying machine comprising a body, rotatable arms mounted therein, rotatable frames on said arms, wings horizontally arranged on and rotatable in the frames, means for rotating the arms, means for rotating the frames in the arms, manual means on the body for changing the position of said wings on the frames relative to the body, and means for automatically maintaining the wings in said position.

4. A flying machine comprising a body, rotatable arms mounted therein, rotatable frames on said arms, wings horizontally arranged in the frames, a counterbalance for said wings in the frames, and means for rotating the arms.

5. A flying machine comprising a body, rotatable arms mounted therein, rotatable frames on said arms, wings horizontally arranged in the frames, a counterbalance for said wings in the frames, means for rotating the arms, and means for rotating said frames on the arms.

6. A flying machine comprising a body, rotatable arms mounted therein, rotatable frames on said arms, wings horizontally arranged in the frames, a counterbalance for said wings in the frames, means for rotating the arms, means for rotating the frames in the arms, and means for automatically maintaining said wings in a predetermined position.

7. A flying machine comprising a body, rotatable arms mounted therein, rotatable frames on said arms, wings horizontally arranged in said frames, a counterbalance for said wings in the frames, means for rotating the arms, means for rotating the frames in the arms, means on the body for changing the position of said wings relative to the body, and means for automatically maintaining the wings in said position.

8. A flying machine comprising a body, rotatable arms mounted thereon, rotatable frames on said arms, wings horizontally arranged on the arms, a counterbalance for said wings in said frames, means for rotating the arms, means for rotating the frames in the arms, manual means on the body for changing the position of the wings relative to the body and means for automatically maintaining the wings in said position.

9. A flying machine comprising a body, rotatable arms mounted therein, rotatable frames on said arms, wings on and rotatable in said frames, means for rotating the arms in one direction, and means for rotating the frames in a reverse direction.

10. A flying machine comprising rotatable wing frames including a shaft, radial arms rigidly mounted thereon and wings secured between said arms, each of said wings having one of its edges flexible.

11. A flying machine comprising rotatable wing frames including a shaft, sets of parallel radial arms rigidly mounted thereon, said sets of arms being diametrically opposed on the shaft, and wings secured between said arms, each of said wings having one of its edges flexible.

12. A flying machine comprising rotatable wing frames including a shaft, radial arms mounted thereon and flexible wings secured between said arms, said wings being rigid at their front edges and flexible at their rear edges.

13. A flying machine comprising rotatable wing frames including a shaft, parallel radial arms mounted therein and flexible wings secured between said arms, said wings being rigid at their front edges and flexible at their rear edges.

14. A flying machine comprising rotatable wing frames including a shaft, oppositely disposed radial arms mounted thereon, the arms on one side of said shaft having flexible wings secured therebetween, the other arms serving to counterbalance said wings and arms.

15. A flying machine comprising rotatable wing frames including a shaft, oppositely disposed parallel radial arms mounted thereon, the arms on one side of said shaft having flexible wings secured therebetween, the other arms serving to counterbalance said wings and arms.

In testimony, that I claim the foregoing as my invention, I have signed my name this 24th day of September, 1917.

GUSTAF HEDÉN.

Copies of this patent may be obtained for five cents each, by addressing the "Commissioner of Patents, Washington, D. C."